Patented Jan. 4, 1949

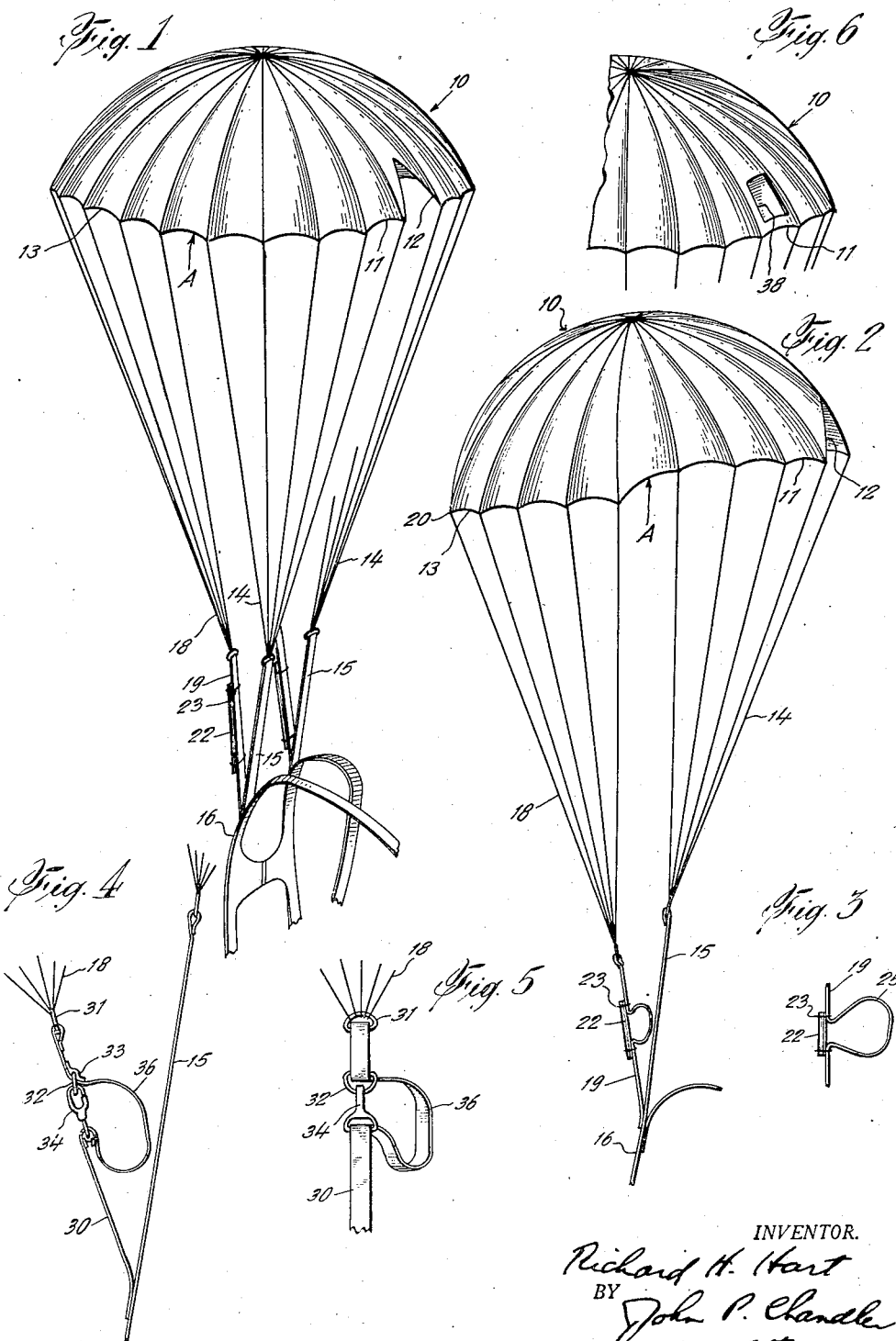

2,458,264

UNITED STATES PATENT OFFICE 2,458,264

PARACHUTE

Richard H. Hart, New Orleans, La.

Application May 25, 1945, Serial No. 595,778

10 Claims. (Cl. 244—142)

This invention relates to new and useful improvements in parachutes, and has for its principal object the provision of a novel parachute having a high measure of stability and dirigibility.

It is known that a parachute formed with a canopy having a projected area approximating a regular polygon in shape is readily packed in a container, is economical to manufacture, is efficient in lift, and is resistant to shock. Parachutes of this type, however, leave much to be desired in the way of performance, particularly in their lack of stability and maneuverability. It is also known that the venting of a substantial volume of air from a parachute canopy at a point above its lowest periphery, has a stabilizing effect upon the parachute. I have also found that from the standpoint of volume, the discharge of air from a vent removed from the center of the canopy reduces the lift efficiency of the parachute to a lesser degree than does venting of air from the center of the canopy. I have also demonstrated that if the vent is located at or closely adjacent the peripheral edge of the canopy, collapse in flight is virtually impossible.

A non-central vent may also be employed advantageously to propel and steer a parachute. It is one of the principal objects of the present invention to provide improved means whereby a parachute having a canopy incorporating a non-central vent may be conveniently and efficiently steered. Another object of the invention is to provide an improved parachute having novel means for propelling the parachute independently of wind-drift, thus enabling the parachutist to land in almost the exact spot desired.

Steering of a parachute, the canopy of which incorporates a non-central vent, may be achieved by the manipulation of the sides of the vent in such a manner as to influence and direct the current of air discharged from the vent. This may be done by separate steering lines, although the provision of such lines add to the weight and bulk of the parachute and may impose an additional hazard of fouling. It is an important object of the present invention to provide an improved parachute wherein the regular suspension lines may serve additionally as steering lines.

When a vent is formed in the canopy at or adjacent its peripheral edge, the horizontal discharge of a column of air through this vent imparts movement to the parachute independent of wind-drift. The travel which results from such venting of a horizontal column of air from the parachute is based upon the principle of jet propulsion. Accordingly, the side having the vent may be considered as the rear of the parachute. Certain considerations of efficiency in respect of inflation and lift limit the maximum size of such vent. I have found that this forward travel may be very considerably augmented if the forward edge of the parachute, after launching, is drawn downwardly to a plane below that occupied by the plane of the rear edge, the center of which is provided with the vent. In this fashion, back-pressure of air against that portion of the canopy drawn down below the normal level of the peripheral edge of the canopy augments the forward movement produced by the vent.

Since the parachutist could, with difficulty, manually draw down the forward edge of the parachute while manipulating the steering lines incorporated in the rear suspension lines, I have devised a novel arrangement whereby the front suspension lines are automatically foreshortened after launching, thus drawing the forward edge of the canopy downwardly, to produce this forward travel, without any effort on the part of the parachutist. I have also found that when the peripheral edge on one side of the canopy is drawn downwardly during flight, the over-all stability of the parachute is greatly increased. Hence, the mechanical means for drawing such edge downwardly will be found valuable in the case of inanimate cargo, or in other instances wherein steering of the parachute might not be possible or desirable. Furthermore, I have found that a parachute of the character described considerably reduces oscillation, and enables the parachutist to make a landing in most instances on the exact spot of his choosing.

In the drawings:

Fig. 1 is a perspective view of a parachute embodying the present invention, the view showing a portion of the rear edge and a portion of the front edge of the parachute.

Fig. 2 is a full side elevation of the parachute.

Fig. 3 is a broken side elevation showing the position of the parts when the elastic element is at rest.

Fig. 4 is a broken side elevation showing a modification in the construction of the parachute.

Fig. 5 is a front elevation of the structure shown in Fig. 4.

Fig. 6 is a broken perspective view of a modified form of canopy wherein the vent is adjacent to, but is slightly spaced from, the peripheral edge of the parachute.

Referring now more particularly to the drawing, it will be noted that the parachute of the present invention is formed with a canopy 10 of generally circular shape. This canopy may be of usual construction, except that substantially at the center of the rear edge, which is designated by the reference numeral 11, there is formed a vent 12 which, in the form shown, is substantially triangular in shape. The size of the vent will depend upon a number of considerations, but in general it may bear substantially the relationship shown to the total canopy area. The front edge of the canopy is designated as 13, and for convenience in reference the point "A" may be considered as coinciding with a line dividing the front and rear edge sections of the parachute. The parachute is provided with the usual suspension lines.

Extending downwardly from the rear edge 11 are two groups of lines 14, the groups being disposed on opposite sides of vent 12. At their lower ends, lines 14 of each rear group are secured to a riser 15 connected with harness 16. Extending downwardly from the front edge 13 are a plurality of lines 18 arranged in groups, such groups of lines being secured at their lower ends to the front risers 19, also appropriately connected with harness 16.

From the foregoing, it will be appreciated that if the parachutist pulls upon one or the other of the rear risers 15, the suspension lines on one side or the other of vent 12 will be drawn downwardly. This draws inwardly that portion of the canopy lying adjacent the vent, thus deflecting the current of air discharged from the vent from its normal direction radially of the canopy, to a direction substantially at right angles to this normal direction. In other words, the current of air now follows the direction of a line substantially tangent to the periphery of the canopy at the point of the vent. This causes the parachute to rotate in a direction opposite from the side so drawn downwardly. When rotation has continued until the center front 20 of the canopy is pointing in the direction of desired travel, the riser is released and the parachute commences travel in such direction, subject, of course, to wind-drift.

Front risers 19 differ from rear risers 15 in that the former are provided, substantially intermediate their ends, with elastic or extensible elements 22 which are secured at their opposed terminals to the risers, as shown at 23. The purpose of the elastic elements or shock-absorber cords 22 is to reduce the effective length of the risers 19, and accordingly the front suspension lines, after the initial impact of the launching, are drawn downwardly, thereby lowering the front peripheral edge of the canopy. Fig. 3 shows the relationship of the elastic element to the riser when such elastic element is not under tension, and it will be seen that the opposed terminals of the element are secured to points on the riser spaced apart a considerably shorter distance than the length of the elastic element when at rest, thus forming loop 25. Fig. 1, on the other hand, shows the elastic elements fully distended, which is their condition upon initial launching, and at such time the loop portions of the risers bear the entire load. After launching, however, each elastic element contracts, as shown in Fig. 2, and, depending upon the load carried, may be half the length, more or less, shown in Fig. 1.

No particular details of the construction of the elastic element are shown, and if desired a coil spring or other equivalent means could be employed. This extensible member further serves to reduce shock upon launching, and, at the same time, permits the front risers to have their greatest potential length, and the consequent assumption by the canopy of its most regular aspect in which it is best fitted to withstand the initial strain of launching.

Two front risers employing the elastic foreshortening elements are illustrated in the drawing. In some cases it may be desired to employ only one, and in other instances more than two may be used. Also, a plurality of the extensible members may be incorporated in each riser, either in series or in parallel relationship.

In Figs. 4 and 5, alternate means are shown for shortening front risers 30 manually instead of automatically, as is the case with the elastic member 22. In this instance, the upper end of the riser 30 is secured to a D-ring 31, which, in turn, is secured to the lower terminals of front suspension lines 18. A second D-ring 32 is firmly secured at 33 to riser 30 at a point below D-ring 31. A snap member 34 is also secured to riser 30 in approximately the position shown. Thus, when snap member 34 is secured to D-ring 32, loop 36 is formed, thus shortening the effective length of riser 30. In case this arrangement is employed, the parachutist after launching will manually raise snap member 34 to its elevated position wherein it is received on D-ring 32, and if two of such risers are provided, he may do the same in respect of the second riser.

In Fig. 6, a vent 38 is formed in the canopy at a point adjacent to, but spaced from, the rear edge 11 of the canopy. This modified arrangement is useful in certain instances. In both Figs. 1 and 6, the vents are shown as being not greater than the width of one gore of the canopy. In some instances, however, the width of the vent may be appropriately increased.

The operation of the parachute embodying the present invention will be largely clear from the foregoing description. The parachute may be launched in any desired manner, inflation taking place as in the case of an ordinary parachute, except that during the later phase of inflation the retarded extension of the front riser or risers, owing to the elastic action of the shock-absorber cord attached thereto, will reduce to some degree the shock usually incident to such phase. Immediately upon completion of inflation, the elastic reaction of the shock-absorber cord will function to draw together that section of the front riser or risers to which it is attached, thereby drawing downward the suspension lines and that portion of the peripheral edge of the canopy to which they are connected, damping the oscillatory tendency of the parachute, and, at the same time, imparting forward moment to the parachute. This moment, added to the moment derived from discharge of air from the vent, will impart to the parachute a considerable rate of horizontal travel, independent of wind-drift.

In a case where a harness-type snap and D-ring combination or other comparable means are employed in place of the elastic elements, the parachute is launched and inflated in the ordinary manner, immediately after which the parachutist may manually connect the snap to the D-ring, or so manipulate the comparable means as to effectively shorten the front riser or risers, accomplishing the above mentioned oscillation-damping and travel-engendering results without further effort, and leaving the parachutist free to steer his craft and engineer a safe and convenient landing.

In addition to being adapted for emergency use, parachutes embodying the present invention are especially suitable for use by paratroops, forest-fire fighters, or other parachutists making mass jumps, by reason of the virtual impossibility, as mentioned above, of collapsing such parachutes while in flight, thereby minimizing hazards resulting from collisions, which, with ordinary parachutes, may be very serious.

It will be appreciated that the automatic or the manually actuable means for drawing downwardly the front edge of the parachute has considerable usefulness whether the specific vent is used, or whether no steering means of any character is employed. It will also be understood that the specific vents of Fig. 1 or 6 may be used without incorporating in the parachute means for drawing down the forward edge.

While I have herein shown and described three forms or embodiments of my invention for illustrative purposes, and have disclosed and discussed in detail the construction and arrangement incidental to three specific applications thereof, it is to be understood that the invention is limited neither to the mere details or relative arrangement of parts, nor to its specific embodiments shown herein, but that extensive deviations from the illustrated forms or embodiments of the invention may be made without departing from the principles thereof.

What I claim is:

1. A parachute including a canopy and suspension means, the canopy having a non-central vent therein, said suspension means being gathered into a plurality of groups, and adjustable means for shortening only a group of said suspension means upon the side of said canopy opposite to said vent after inflation of the canopy; said suspension means on the side of said vent remaining constant at all times.

2. A parachute including a canopy and suspension means, said canopy having a non-central vent therein, said suspension means being gathered into a plurality of groups, and manually actuable means for pulling downwardly only a group of said suspension means upon the side of said canopy opposite to said vent after inflation of said canopy; said suspension means on the side of said vent remaining constant at all times.

3. A parachute including a generally circular canopy and suspension means extending downwardly therefrom, said suspension means being gathered into a plurality of groups, adjustable means in some of said groups for shortening only them after inflation of said canopy, and the remainder of said groups remaining constant in length at all times during and after inflation of said canopy.

4. In a parachute provided with a harness, the combination of a canopy including front and rear sections, the rear section having a vent adjacent its marginal edge, a plurality of spaced front and rear suspension lines extending downwardly from the marginal edge of the canopy, a plurality of front and rear risers adapted to be secured to the harness at their lower ends and extending upwardly therefrom, the rear suspension lines on each side of the vent being arranged in two equal groups with each group being connected with one rear riser, the forward suspension lines being arranged in two equal groups with each group being connected with one front riser, and varying means forming a part of the front risers only for shortening the front risers after launching to reduce the effective length of the front suspension lines, thus drawing the lower edge of the front section of the canopy downwardly to a plane below that of the lower edge of the rear section; said rear risers remaining constant in length at all times.

5. In a parachute provided with a harness, the combination of a generally-circular canopy including front and rear sections, the rear section having a substantially centrally-disposed vent opening adjacent its marginal edge, a plurality of front and rear suspension lines extending downwardly from the canopy, a plurality of front and rear risers adapted to extend upwardly from the harness, the rear lines on each side of the opening being connected with one of such rear risers, the forward lines being connected with the front risers, and variable means for shortening only the front risers after launching to reduce the effective length of the front lines, thus drawing the lower edge of the front section of the canopy downwardly to a plane below that of the lower edge of the rear section; said rear risers at all times remaining at a fixed length.

6. In a parachute, the combination of a generally-circular canopy provided with front and rear sections, the rear section having a substantially centrally-disposed vent opening adjacent its marginal edge, a plurality of spaced forward and rear suspension lines extending downwardly from the canopy, a harness, a plurality of front and rear risers extending upwardly from the harness, the rear suspension lines on each side of the opening being connected with one of such rear risers, the forward suspension lines being connected with the front risers, each front riser comprising elongated members in side-by-side relationship, one being of elastic character and the other being substantially non-elastic, the elastic member contracting the effective length of each front riser during descent, thus drawing the forward lower edge of the canopy downwardly to a plane below that of the rear lower edge thereof; said rear risers at all times remaining at a fixed length.

7. In a parachute, the combination of a generally-circular canopy including front and rear sections, the rear section having a substantially centrally-disposed vent opening extending inwardly from its marginal edge, a plurality of spaced front and rear suspension lines extending downwardly from the canopy, a harness, a plurality of front and rear risers extending upwardly from the harness, the rear suspension lines on each side of the opening being connected with one of such rear risers, the forward suspension lines being connected with the front risers, and means for automatically shortening the front risers after launching to reduce the effective length of the front risers, thus drawing the forward lower edge of the canopy downwardly to a plane below that of the rear lower edge thereof, such means comprising an elongated, extensible elastic element secured at its opposite ends to each front riser at points spaced apart less than the length of the elastic element when not under tension; said rear risers at all times remaining at a fixed length.

8. In a parachute provided with a harness, the combination of a generally-circular canopy including front and rear sections, the rear section having a substantially centrally-disposed vent opening adjacent its marginal edge, a plurality of front and rear spaced suspension lines extending downwardly from the canopy, a plurality of front and rear risers extending upwardly from the harness, the rear suspension lines on each side of the opening being connected with one of such rear risers, the forward suspension lines being connected with the front risers, and resilient means for shortening only the front risers after launching to reduce the effective length of the front risers, thus drawing the forward lower edge of the canopy downwardly to a plane below that of the rear lower edge thereof, such means comprising an extensible and contractible elastic element associated with each front riser which shortens the front riser while the parachute is supporting a normal load during descent, but which permits each front riser to extend to its full length during launching; said rear risers at all times remaining at a fixed length.

9. In a parachute provided with a harness, the combination of a canopy including front and rear sections, the rear section having a vent adjacent its marginal edge, a plurality of spaced front and rear suspension lines extending downwardly from the marginal edge of the canopy, front and rear risers adapted to be secured to the harness at their lower ends and extending upwardly therefrom, the rear suspension lines on each side of the vent being connected with one of such rear risers, the forward suspension lines being connected with the front risers, and mechanical means for enabling the user to shorten only the front risers after launching to reduce the effective length of the front risers, thus drawing the forward lower edge of the canopy downwardly to a plane below that of the rear lower edge thereof, such means comprising a ring secured to each front riser, a snap also secured to each front riser at a point spaced from the ring, the ring and snap being so spaced apart as to reduce the effective length of each front riser when the snap is attached to the ring.

10. In a parachute provided with a harness, the combination of a canopy including front and rear sections, a plurality of spaced front and rear suspension lines extending downwardly from the marginal edge of the canopy, front and rear risers adapted to be secured to the harness at their lower ends and extending upwardly therefrom, the rear lines being connected with the rear risers, the front lines being connected with a front riser, and means for shortening only the front riser to reduce the effective length of the front lines, thus drawing the forward edge of the canopy downwardly to a plane below that of the rear edge thereof; said rear risers at all times remaining at a fixed length.

RICHARD H. HART.

REFERENCES CITED

The following references are of record in the file of this patent:

UNITED STATES PATENTS

| Number | Name | Date |
|---|---|---|
| 1,877,702 | St. Clair | Sept. 13, 1932 |
| 2,125,198 | Pool | July 26, 1938 |
| 2,307,000 | Hart | Dec. 29, 1942 |

FOREIGN PATENTS

| Number | Country | Date |
|---|---|---|
| 8,649 | Great Britain | 1915 |
| 45,205 | France | Apr. 8, 1935 |
| 226,851 | Great Britain | Dec. 30, 1924 |